United States Patent
Pauly et al.

(10) Patent No.: US 9,780,890 B2
(45) Date of Patent: Oct. 3, 2017

(54) WIRELESS MEASURING SYSTEM AND METHOD FOR MEASUREMENT OF A DEVICE UNDER TEST WITH AN ANTENNA-ARRAY, CONSIDERING MAXIMUM GAIN DIRECTION OF THE ANTENNA ARRAY

(71) Applicant: Rohde & Schwarz GmbH & Co. KG, Munich (DE)

(72) Inventors: Andreas Pauly, Munich (DE); Johannes Steffens, Rosenheim (DE); Meik Kottkamp, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 15/171,928

(22) Filed: Jun. 2, 2016

(65) Prior Publication Data

US 2016/0359573 A1   Dec. 8, 2016

(30) Foreign Application Priority Data

Jun. 8, 2015  (EP) ..................................... 15170968

(51) Int. Cl.
  *H04W 24/06*  (2009.01)
  *H04B 7/06*  (2006.01)
  (Continued)

(52) U.S. Cl.
  CPC ........... *H04B 17/12* (2015.01); *H04B 7/0617* (2013.01); *H04B 17/21* (2015.01); *H04W 24/06* (2013.01);
  (Continued)

(58) Field of Classification Search
  CPC ...... H04B 17/102; H04B 17/12; H04B 17/24; H04B 7/0617; H04B 17/21; H04W 24/06; H01W 3/267; G01R 29/10; G01R 27/28
  See application file for complete search history.

(56) References Cited

U.S. PATENT DOCUMENTS 5,294,934 A * 3/1994 Matsumoto ............ H01Q 3/267
                                                        342/169
5,973,638 A * 10/1999 Robbins ................. H01Q 3/267
                                                        342/171
(Continued)

FOREIGN PATENT DOCUMENTS

DE  102006045645 A1  4/2008
EP       2354801 A1  8/2011

OTHER PUBLICATIONS

EPO, "European Search Report", EP15170968.0, dated Oct. 16, 2015.

*Primary Examiner* — Devan Sandiford
(74) *Attorney, Agent, or Firm* — Potomac Technology Law, LLC

(57) ABSTRACT

A measuring system for measuring a communications device comprising an antenna-array. The measuring system comprises a controller, a measuring device, a measuring antenna and a device mount. The measuring device performs measurements with regard to the communications device. The device mount rotates the communications device about at least one axis. The controller sets a maximum gain direction of the antenna-array. The controller (i) controls the device mount to rotate the communications device, compensating for the set maximum gain direction, until the set maximum gain direction meets a direction of the measuring antenna with respect to the communications device, and (ii) determines an actual maximum gain direction of the antenna-array by iteratively rotating the communications device and determining a respective gain for each iteration, and determines the actual maximum gain direction as a rotation of the device mount that corresponds to the iteration of maximal gain.

17 Claims, 6 Drawing Sheets

(51) Int. Cl.
*H04B 17/12* (2015.01)
*H04B 17/21* (2015.01)
H04B 17/10 (2015.01)
H04W 84/04 (2009.01)

(52) U.S. Cl.
CPC ......... *H04B 17/102* (2015.01); *H04W 84/042* (2013.01)

(56) References Cited

U.S. PATENT DOCUMENTS

| | | | |
|---|---|---|---|
| 8,325,098 B1 * | 12/2012 | Henrie | G01R 29/10 324/632 |
| 2001/0021181 A1 * | 9/2001 | Choi | H04B 7/0617 370/342 |
| 2003/0117315 A1 * | 6/2003 | Graham | G01R 29/10 342/174 |
| 2003/0161261 A1 * | 8/2003 | Weis | H04B 7/0617 370/221 |
| 2009/0051592 A1 * | 2/2009 | Lee | H04B 7/0408 342/368 |
| 2010/0039333 A1 | 2/2010 | Maucksch | |
| 2011/0122032 A1 | 5/2011 | Sakata et al. | |
| 2013/0077708 A1 * | 3/2013 | Sorrells | H04B 1/04 375/295 |
| 2013/0093447 A1 | 4/2013 | Nickel et al. | |
| 2013/0249746 A1 * | 9/2013 | Oh | G01R 29/105 343/703 |
| 2014/0057570 A1 * | 2/2014 | Leiba | H04B 17/12 455/63.4 |
| 2015/0280844 A1 * | 10/2015 | Yu | H04B 17/0085 375/224 |
| 2017/0187109 A1 * | 6/2017 | Wang | H01Q 3/267 |

* cited by examiner

US 9,780,890 B2

WIRELESS MEASURING SYSTEM AND METHOD FOR MEASUREMENT OF A DEVICE UNDER TEST WITH AN ANTENNA-ARRAY, CONSIDERING MAXIMUM GAIN DIRECTION OF THE ANTENNA ARRAY

RELATED APPLICATIONS

This application claims priority to European patent application EP 15 170 968.0, filed Jun. 8, 2015, which is incorporated herein by reference in its entirety.

FIELD

The invention relates to a measuring system and method for communication devices comprising antenna-arrays, especially antenna-arrays used for beamforming.

BACKGROUND

Beyond the current long term evolution LTE technology, and first significant improvements (LTE-A), the next generation mobile communications technology 5G is imminent. Regarding 5G, a move to even higher frequencies and larger bandwidths are to be expected. Although the exact frequency bands are not yet specified, frequencies up to 75 GHz are in discussion. For reaching sufficient ranges using these frequencies, the antenna technology is a core aspect. High antenna gains are necessary. In order to reach such high antenna gains, the use of antennas with a large number of radiating elements, especially phased-array antennas are in discussion.

With increasing frequency, the physical area required for such phased arrays continuously decreases and allows a high integration of respective solutions. Therefore, more attention has to be given to testing the antenna diagrams/beams than with today's technology. Especially, a dynamic adaptation has to be checked. Also, current measurement techniques are typically performed using network analyzers connected by coaxial cables to the device under test. When using highly integrated active antennas, however, such an interface may no longer be effective for performing antenna measurements. When testing devices under test in a lab environment, measuring devices are connected via physical cables with the device under test, which generally results in a stable and reproducible measurement environment. The antenna, however, is generally not used in such measurements. Instead, the test of the antenna implementation is typically performed in a separate measurement.

With 5G technology, however, the active antenna will be an integral part of the device under test. Parameters, such as output power, neighbor channel influence and modulation accuracy, can only be accurately measured taking the antenna into account. Especially, the antenna diagram resulting in the maximum gain direction of the respective antenna-array has to be taken into account.

The patent application publication US20130093447A1 shows a measuring system for performing over-the-air measurements on devices under test. The respective device under test is placed within a device under test holder, which is rotatable by a device under test a rotator. Using a single fixed measuring antenna, measurements are performed. The measuring system according to US20130093447A1 though is not applicable to devices under test that use antenna-arrays, beamforming, antenna diagrams and maximum gain directions of an antenna array. It is therefore not possible to perform accurate measurements on future generations of devices under test using the measuring system of this publication.

The patent application publications EP2354801A1 and DE102006045645A1 show respective holders for testing mobile phones that similarly cannot be applied for devices under test that use antenna-arrays, beamforming, antenna diagrams and maximum gain directions of an antenna array.

What is needed, therefore, is a measuring system and method for performing accurate measurements on communication devices that employ antenna-arrays (e.g., a phased array antenna system).

SUMMARY OF THE INVENTION

Example embodiments of the present invention advantageously address the foregoing requirements and needs, as well as others, by providing a measuring system and method for performing accurate measurements on communication devices that employ antenna-arrays (e.g., a phased array antenna system).

In accordance with example embodiments, a measuring system for measuring a communication device under test is provided. The measuring system comprises a control unit, a measuring device, at least one measuring antenna and a device under test mount. The at least one measuring antenna is mounted in a fixed location and orientation regarding the device under test mount. The device under test mount is adapted to hold the device under test and rotate the device under test about one or more axes of rotation.

According to further embodiments, the measuring system is adapted for measuring a communication device under test comprising an antenna-array.

According to one embodiment, the control unit is adapted to set an antenna characteristic of the antenna-array of the device under test, such as adjusting a set maximum gain direction of the antenna-array. By way of example, the control unit is adapted to instruct the device under test mount to rotate the communication device under test compensating for the set maximum gain direction of the antenna-array, so that the set maximum gain direction of the antenna-array meets a direction of the measuring antenna regarding the device under test. By way of further example, the control unit is adapted to determine an actual maximum gain direction of the antenna-array by iteratively instructing the device under test mount to rotate the device under test to determine a present gain of the antenna-array, and to determining the actual maximum gain direction as a rotation direction of the device under test mount of maximal gain. The measuring system thereby facilitates an accurate determination of the function of setting the antenna characteristics and the maximum gain direction of the antenna-array with a low-complexity hardware implementation.

According to a further embodiment, the control unit is adapted to determine a maximum gain misalignment as a measuring result by determining a difference between the set maximum gain direction of the antenna-array and the actual maximum gain direction of the antenna-array. Thereby, a parameter is easily generated for effectively determining the quality of an antenna-array adjustment.

According to a further embodiment, the control unit is adapted to determine the actual maximum gain direction of the antenna-array by, after instructing the device under test mount to rotate the device under test and determining a present gain of the antenna-array, determining a gain-difference of the present gain regarding a previous gain, reversing a direction of rotating the device under test for a following iteration, if the gain difference is negative and above a first pre-specified threshold, reducing a rotation amount for a following iteration, if the gain difference is positive and below a second pre-specified threshold and/or determining the actual maximum gain direction of the antenna-array as a present direction, if the gain difference is below the first pre-specified threshold. It is thus possible to efficiently determine the actual maximum gain direction of the antenna-array.

According to a further embodiment, for a reception measurement, the measuring system comprises a signal generator adapted to generate a measuring signal. The measuring antenna is then adapted to transmit the measuring signal generated by the signal generator to the device under test. It is thus possible to perform reception measurements with the measuring system with minimal effort. By way of example, the control unit is adapted to determine the present gain of the antenna-array by respectively instructing the device under test to measure a reception power of the measuring signal and comparing the reception power to a transmission power of the measuring signal. An efficient determining of the present gain of the antenna-array is thereby possible.

According to a further embodiment, for a transmission measurement, the measuring system comprises a signal analyzer. The control unit is then adapted to instruct the communication device under test to generate a measuring signal and transmitted to the measuring antenna. The signal analyzer is adapted to receive the measuring signal. It is thereby possible to very efficiently to perform a transmission measurement. By way of example, the control unit is adapted to determine the present gain of the antenna-array by instructing the signal analyzer to measure a reception power of the measuring signal and by comparing the reception power to a transmission power of the measuring signal. An efficient determining of the present gain of the antenna-array is thereby possible.

According to a further embodiment, the device under test mount is adapted to rotate the device under test around two axes. Thereby, a three-dimensional measuring is possible.

In accordance with further example embodiments, a measuring method for performing measurements on a communication device under test having an antenna-array, is provided. The measuring method comprises positioning at least one measuring antenna in a fixed location and orientation regarding a device under test mount and positioning the communication device under test in the device under test mount. The measuring method further comprises setting an antenna characteristic of the antenna-array of the communication device under test thereby adjusting a set maximum gain direction of the antenna-array. By way of example, the method comprises the step of rotating the communication device under test using the device under test mount and compensating for the set maximum gain direction of the antenna-array, so that the set maximum gain direction of the antenna-array meets a direction of the measuring antenna regarding the device under test. By way of further example, the method comprises determining an actual maximum gain direction of the antenna-array by iteratively rotating the communication device under test using the device under test mount, determining a present gain of the antenna-array and determining the actual maximum gain direction as a rotation direction of the device under test mount of maximal gain. Thereby, a very efficient determining of the characteristics of the device under test is possible.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Example embodiments of the present invention are illustrated by way of example only and not by way of any limitation in the figures of the accompanying drawings, in which like reference numerals refer to similar elements and/or functions, and in which.

DETAILED DESCRIPTION

Figure 1:
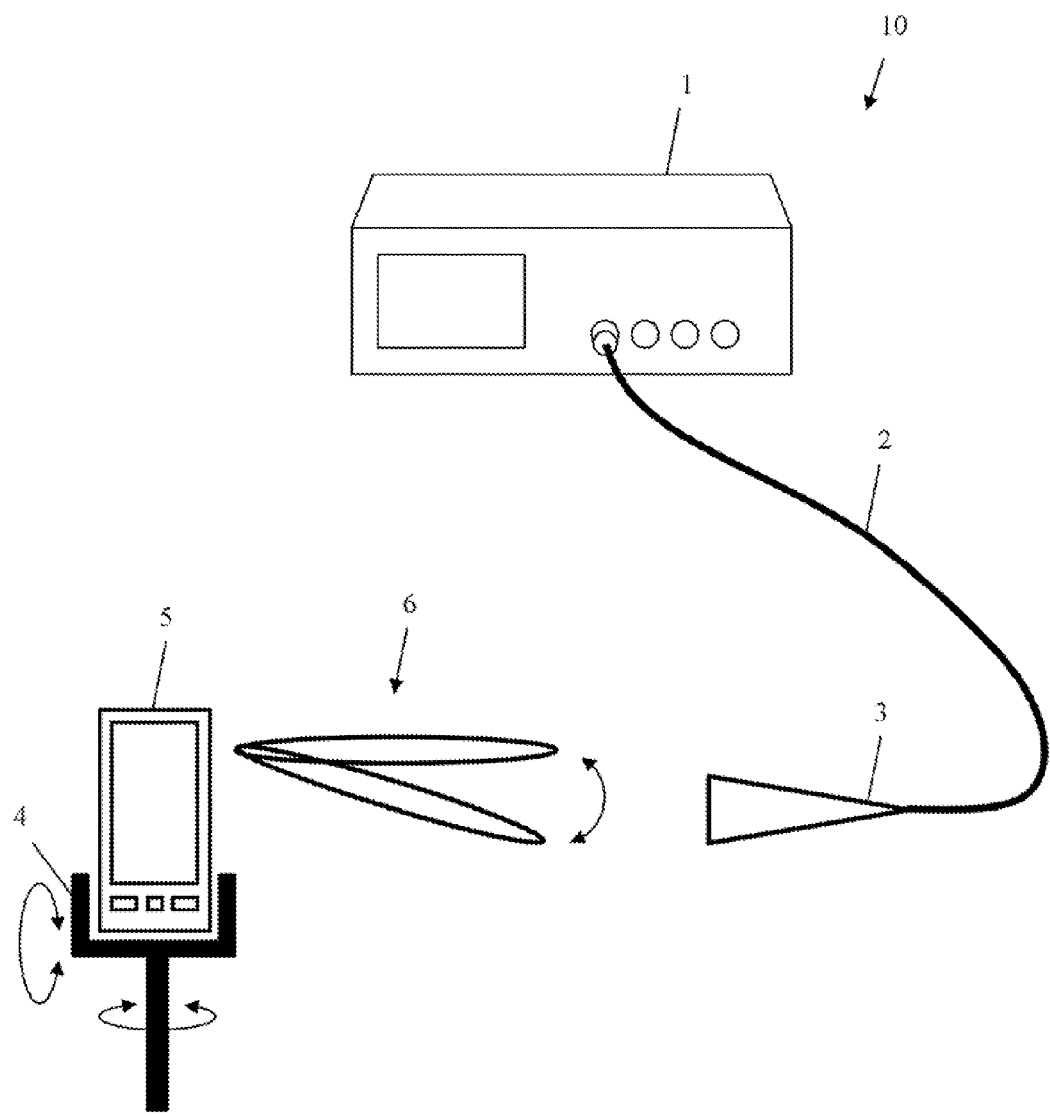
FIG. 1 shows a block diagram of a three dimensional overview of a measuring system, in accordance with example embodiments.

FIG. 1 shows a block diagram of a three dimensional overview of a measuring system, in accordance with example embodiments of the present invention. The measuring system 10 comprises a measuring device 1, a measuring antenna 3 connected to the measuring device 1 by a coaxial cable 2 and a device under test mount 4. The device under test mount 4 holds a communication device under test 5. The device under test 5 comprises an antenna-array (which is not depicted in the figure as an external antenna of the device 5). By adjusting the antenna characteristic of the antenna-array, different antenna characteristics, and thereby maximum gain directions 6, of the antenna-array can be set.

When performing a transmission measurement, the device under test 5 transmits a measuring signal using a presently set antenna characteristic, and thereby a presently set maximum gain direction 6. The measuring signal is received by the measuring antenna 3 and handed on to the measuring device 1 via the coaxial cable 2. In this case, the measuring device 1 is for example a signal analyzer.

For performing a reception measurement, the measuring device 1, in this case for example a signal generator, generates a measuring signal and hands it to the measuring antenna 3 via the coaxial cable 2. The measuring antenna 3 transmits the measuring signal to the device under test 5, which receives it. The antenna characteristic of the antenna-array of the device under test 5 also influences the reception of the measuring signal from the measuring antenna 3.

The device under test mount 4 and the measuring antenna 3 are located in fixed positions with regard to each other. This allows for a very simple hardware setup. The device under test mount 4 though is rotatable around one or more axes of rotation. It is thereby possible to rotate the device under test 5 so that the maximum gain direction 6 of the antenna-array points towards the measuring antenna 3 at all times. Details of this function are explained below, for example, with regard to FIGS. 4a-4d.

Figure 2:
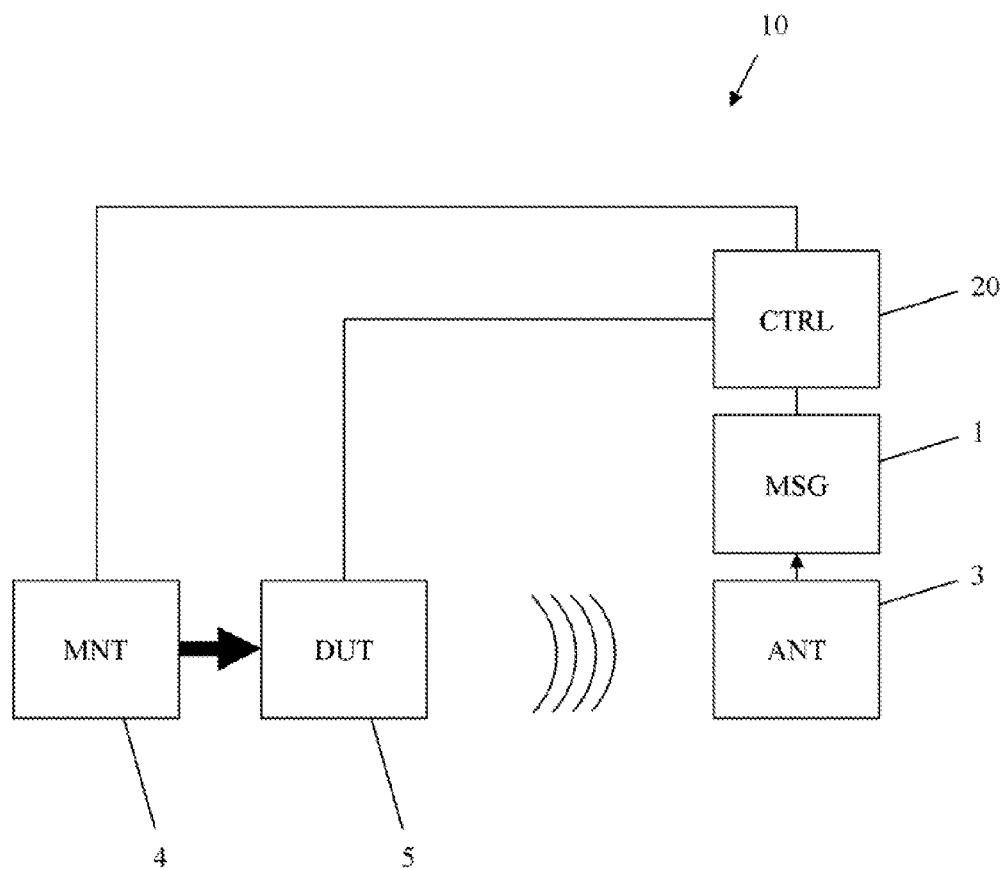
FIG. 2 shows a block diagram of a configuration of the measuring system for performing a transmission measurement, in accordance with example embodiments.

FIG. 2 shows a block diagram of a configuration of the measuring system for performing a transmission measurement, in accordance with example embodiments of the present invention. In addition to the components already described along FIG. 1, here a control unit 20 is shown. The control unit 20 is adapted to control the function of the device under test 5 and the device under test mount 4. Also the control unit 20 controls the function of the measuring device 1. Since here, a transmission measurement is performed, the device under test 5 is instructed by the control unit 20 to emit a measuring signal, which is then received by the measuring antenna 3 and further processed by the measuring device 1, which in this case for example is a signal analyzer. Moreover, the control unit 20 controls the device under test mount 4 to rotate the device under test 5, as required.

Figure 3:
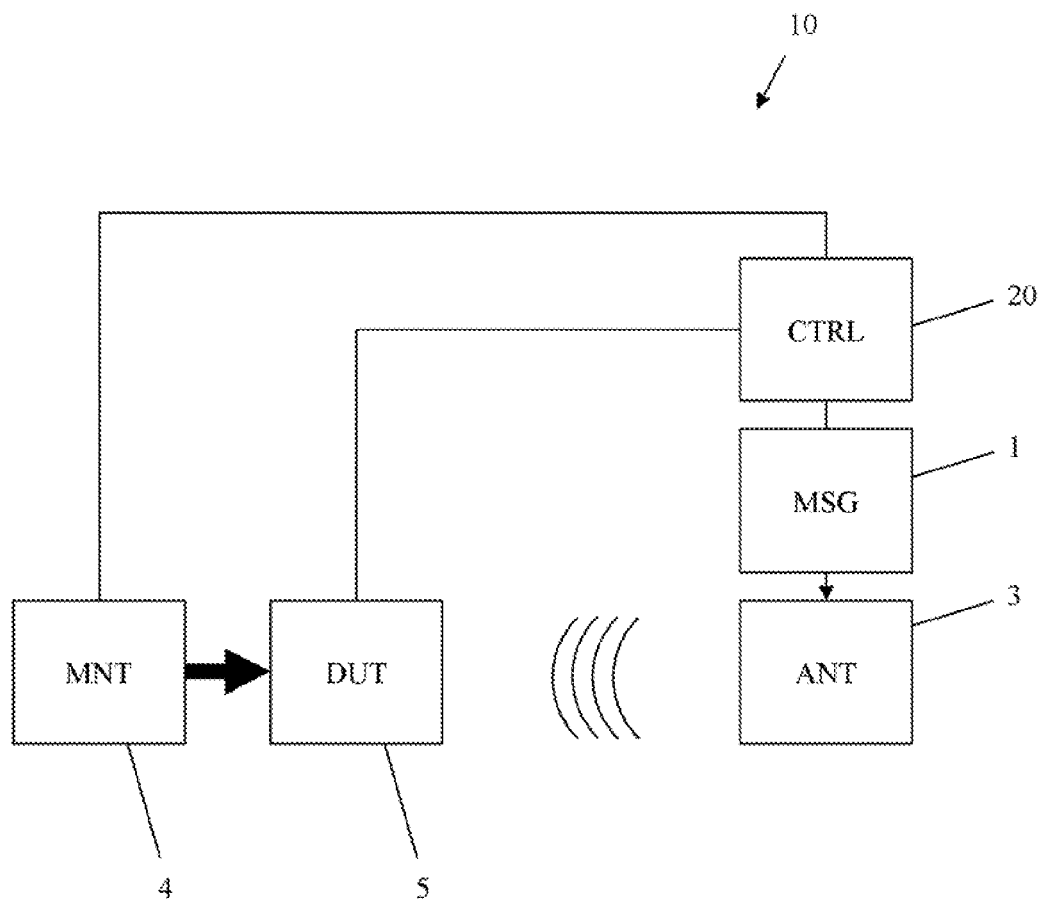
FIG. 3 shows a block diagram of a configuration of the measuring system for performing a reception measurement, in accordance with example embodiments.

FIG. 3 shows a block diagram of a configuration of the measuring system for performing a reception measurement, in accordance with example embodiments of the present invention. In this embodiment, the measuring system 10 is configured for performing a reception measurement by the device under test 5. The control unit 20 controls the measuring device 1, which in this case can for example be a signal generator, to generate a measuring signal and transmit it to the device under test 5 using the measuring antenna 3. Moreover, the control unit 20 controls the device under test 5 to receive the measuring signal. Also, the control unit 20 controls the device under test mount 4, as required.

Figure 4A:
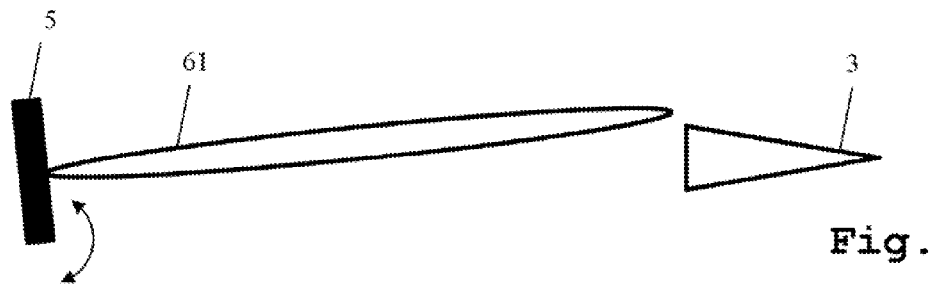
FIG. 4a shows a two-dimensional overview of the device under test and a set maximum gain direction in a first step of performing a measurement, in accordance with example embodiments.

FIGS. 4a-4d show the progress of a typical measurement using a measuring system in accordance with example embodiments of the present invention. FIG. 4a shows a two-dimensional overview of the device under test and a set maximum gain direction in a first step of performing the measurement. By way of example, FIG. 4a reflects an initial situation after placing a device under test 5 on the device under test mount 4. The device under test 5 is set to a certain antenna characteristic resulting in a maximum gain direction 61 of the antenna-array. At present, the set maximum gain direction 61 of the antenna-array is not in alignment with the direction of the measuring antenna 3.

In a first step, the device under test mount 4 is rotated around at least one axis in order to align the set maximum gain direction 61 with the direction of the measuring antenna 3. In case of a transmission measurement, this is done by iteratively rotating the device under test mount and measuring the reception power received by the measuring antenna 3. When a maximum reception power is reached, an alignment of the set maximum gain direction 61 with the direction of the measuring antenna 3 is achieved. This is depicted in FIG. 4b.

Figure 4B:
FIG. 4b shows a two-dimensional overview of the device under test and a set maximum gain direction in a second step of performing a measurement, in accordance with example embodiments.
Figure 4C:
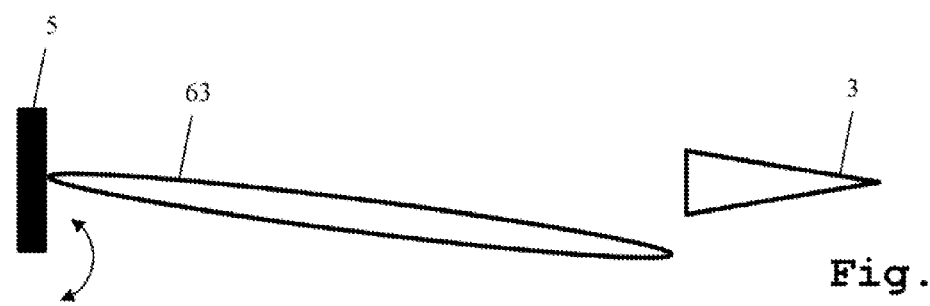
FIG. 4c shows a two-dimensional overview of the device under test and a set maximum gain direction in a third step of performing a measurement, in accordance with example embodiments.
Figure 4D:
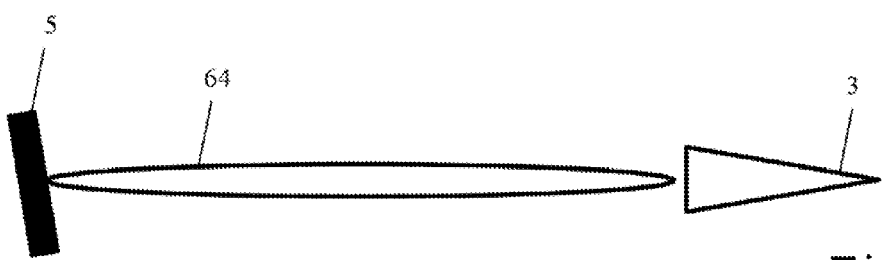
FIG. 4d shows a two-dimensional overview of the device under test and a set maximum gain direction in a fourth step of performing a measurement, in accordance with example embodiments.

FIG. 4b shows a two-dimensional overview of the device under test and a set maximum gain direction in a second step of performing the measurement. In the second step, in order to test the accuracy of the setting of the antenna characteristics and thereby of the setting of the maximum gain direction of the antenna-array, a further antenna characteristic of the antenna-array is set. Thereby, the set maximum gain direction 62 of the antenna-array is changed to the maximum gain direction 63 as depicted in FIG. 4c. FIG. 4c shows a two-dimensional overview of the device under test and a set maximum gain direction in a third step of performing the measurement. In the third step, the device under test mount is now rotated in the opposite direction (e.g., by the same amount) resulting in a rotation of the maximum gain direction 64 as depicted in FIG. 4d. FIG. 4d shows a two-dimensional overview of the device under test and a set maximum gain direction in a fourth step of performing a measurement.

In an optimal case of ideal functioning of the antenna characteristic adjustment, the maximum gain direction 64 is now perfectly in alignment with the measuring antenna 3. In practice, this is though not necessarily the case. Therefore, now again an iterative detection of the maximum gain direction is performed by again rotating the device under test mount and thereby the device under test 5, until an optimal alignment of the maximum gain direction 64 with the measuring antenna 3 is achieved. The resulting additional rotation angle of the device under test mount and the device under test 5 corresponds to a maximum gain misalignment, which can be used as a measuring result. Additional measurement can now be performed on the device under test 5.

Figure 5:
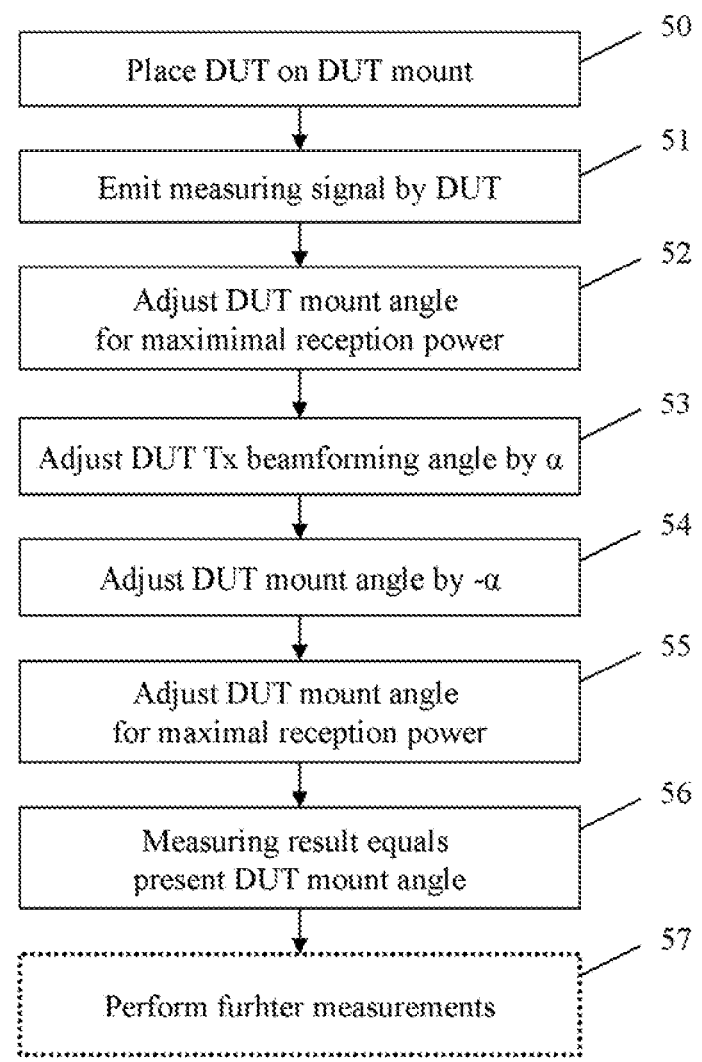
FIG. 5 shows a flow chart depicting a measuring method for performing a transmission measurement, in accordance with example embodiments.

FIG. 5 shows a flow chart depicting a measuring method for performing a transmission measurement, in accordance with example embodiments of the present invention. In a first step 50, a device under test is placed on a device under test mount. In a second step 51, a measuring signal is emitted by the device under test. In a third step 52, the device under test mount angle is adjusted by rotating the device under test mount for a maximal reception power by the measuring antenna. In a fourth step 53, an antenna characteristic of the antenna-array of the device under test is adjusted by an angle α, especially a beamforming angle is adjusted. In a fifth step 54, the device under test mount is rotated by the angle α into the opposite direction.

In a sixth step 55, again the device under test mount is rotated to achieve maximum reception power. In a seventh step 56, as a measuring result, a maximum gain direction misalignment is determined as a measuring result by subtracting the set maximum gain direction and the present maximum gain direction determined in the sixth step 55. In an optional eighth step 57, additional measurements can be performed on the device under test at this position of maximum gain direction of the measuring antenna. Thereby, reproducible measuring conditions can be achieved every time a device under test is measured.

Figure 6:
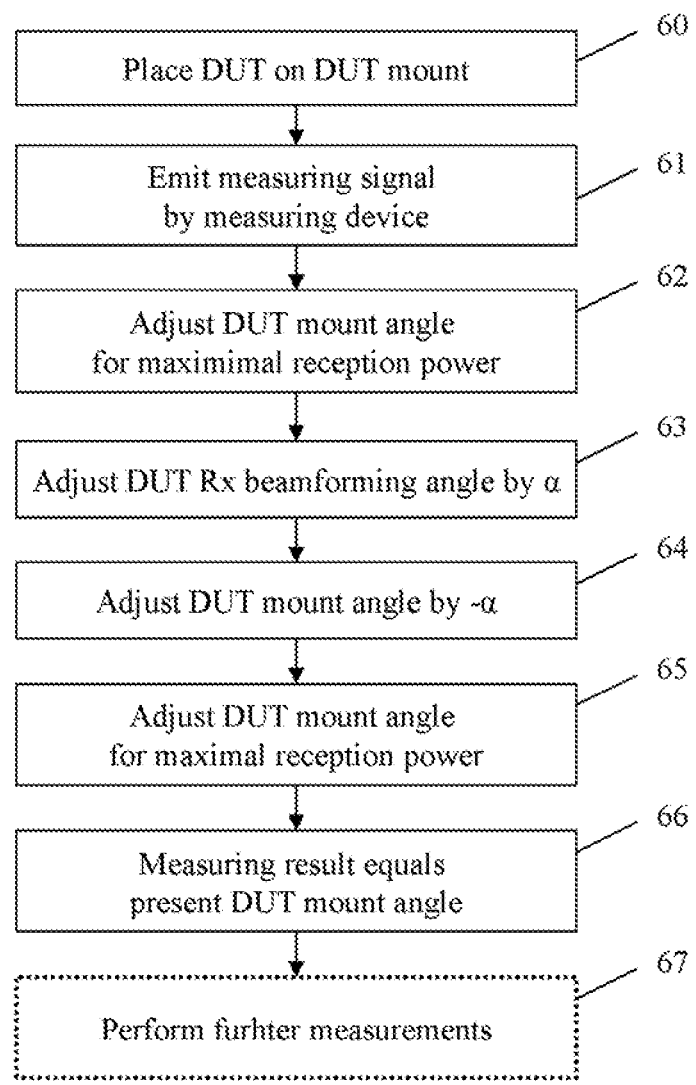
FIG. 6 shows a flow chart depicting a measuring method for performing a reception measurement, in accordance with example embodiments.

FIG. 6 shows a flow chart depicting a measuring method for performing a reception measurement, in accordance with example embodiments of the present invention. In a first step 60, a device under test is placed on a device under test mount. In a second step 61, a measuring signal is emitted by a measuring device and received by the device under test. In a third step 62, the device under test mount is rotated to adjust a device under test mount angle for maximal reception power. This reception power is detected by the device under test itself. In a fourth step 63, the antenna characteristic of the device under test is adjusted resulting in a rotation of a set maximum gain direction of the antenna-array by an angle of α. In a fifth step 64, the device under test mount is rotated in the opposite direction by the angle α.

In a sixth step 65, again the device under test mount is rotated in order to maximize the reception power by the device under test. A present maximum gain direction is thereby determined. In a seventh step 66, a measuring result is determined by determining a maximum gain direction misalignment by calculating the difference between the set maximum gain direction and the present maximum gain direction. Also here, in an optional eighth step 67, further measurements can now be performed on the device under test.

The invention is not limited to the examples shown above. Especially it is not limited to mobile telephones or base stations. Any communication device, which comprises a plurality of antennas grouped in an antenna-array can be used as a device under test. Also the measuring device described above is not limited to the examples of signal generator and signal analyzer. Also other measuring devices can be used. The characteristics of the exemplary embodiments can be used in any advantageous combination.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A measuring system comprising:
   a measuring device configured to perform measurements with regard to a communications device that employs an antenna-array;
   at least one measuring antenna;
   a device mount configured to hold the communications device and to rotate the communications device about at least one axis; and
   a controller configured to set an antenna characteristic of the antenna-array of the communications device, whereby the controller is configured to control the device mount to rotate the communications device, compensating for a set maximum gain direction of the antenna-array, until the set maximum gain direction of the antenna-array meets a direction of the measuring antenna with respect to the communications device, and to thereby adjust the set maximum gain direction of the antenna-array.

2. The measuring system according to claim 1, wherein the controller is configured to determine an actual maximum gain direction of the antenna-array by iteratively controlling the device mount to rotate the communications device and determining a respective gain of the antenna-array for each iteration, and determining the actual maximum gain direction of the antenna-array as a rotation of the device mount that corresponds to the iteration of maximum gain.

3. The measuring system according to claim 2, wherein the controller is further configured to determine a maximum gain misalignment by determining a difference between the set maximum gain direction of the antenna-array and the actual maximum gain direction of the antenna-array.

4. The measuring system according to claim 2, wherein the controller is configured to determine the actual maximum gain direction of the antenna-array by:
   determining a gain difference between the respective gain for a current iteration and the respective gain for a previous iteration;
   when the gain difference is negative and above a first pre-specified threshold, reversing a direction of rotation of the communications device for a subsequent iteration, or when the gain difference is positive and below a second pre-specified threshold, reducing a rotation amount for the subsequent iteration; and
   continuing the iterations and determining the actual maximum gain direction of the antenna-array as the gain direction of the iteration where the gain difference is below the first pre-specified threshold.

5. The measuring system according to claim 2, wherein, for a reception measurement, the measuring device is a signal generator configured to generate a measuring signal, and the measuring antenna is configured to transmit the measuring signal generated by the signal generator to the communications device.

6. The measuring system according to claim 5, wherein the controller is configured to determine the respective gain of the antenna-array for each iteration by controlling the communications device to measure a reception power of the measuring signal, and comparing the reception power to a transmission power of the measuring signal.

7. The measuring system according to claim 2, wherein, for a transmission measurement, the measuring device is a signal analyzer, and the controller is configured to control the communications device to generate a measuring signal and to transmit the measuring signal to the measuring antenna, and the signal analyzer is configured to receive the measuring signal.

8. The measuring system according to claim 7, wherein the controller is configured to determine the respective gain of the antenna-array for each iteration by controlling the signal analyzer to measure a reception power of the measuring signal, and comparing the reception power to a transmission power of the measuring signal.

9. The measuring system according to claim 1, wherein the device mount is configured to rotate the communications device about more than one axis.

10. A measuring method comprising:
 positioning a communications device employing an antenna-array in a device mount of a measuring system; and
 setting an antenna characteristic of the antenna-array of the communications device by rotating the communications device via the device mount, compensating for a set maximum gain direction of the antenna-array, until the set maximum gain direction of the antenna-array meets a direction of the measuring antenna with respect to the communications device, and thereby adjusting the set maximum gain direction of the antenna-array.

11. The measuring method according to claim 10, further comprising:
 determining an actual maximum gain direction of the antenna-array by iteratively rotating the communications device via the device mount and determining a respective gain of the antenna-array for each iteration, and determining the actual maximum gain of the antenna-array as a rotation of the device mount that corresponds to the iteration of maximum gain.

12. The measuring method according to claim 11, wherein the method further comprises:
 determining a maximum gain misalignment by determining a difference between the set maximum gain direction of the antenna-array and the actual maximum gain direction of the antenna-array.

13. The measuring method according to claim 11, wherein the determination of the actual maximum gain direction of the antenna-array comprises:
 determining a gain difference between the respective gain for a current iteration and the respective gain for a previous iteration;
 when the gain difference is negative and above a first pre-specified threshold, reversing a direction of rotation of the communications device for a subsequent iteration, or when the gain difference is positive and below a second pre-specified threshold, reducing a rotation amount for the subsequent iteration; and
 continuing the iterations and determining the actual maximum gain direction of the antenna-array as the gain direction of the iteration where the gain difference is below the first pre-specified threshold.

14. The measuring method according to claim 11, wherein for a reception measurement, the method comprises:
 generating a measuring signal; and
 transmitting the measuring signal to the communications device.

15. Measuring method according to claim 14, wherein the determination of the respective gain of the antenna-array for each iteration comprises:
 measuring a reception power of the measuring signal; and
 comparing the reception power to a transmission power of the measuring signal.

16. The measuring method according to claim 11, wherein for a transmission measurement, the method comprises:
 controlling the communications device to generate a measuring signal and to transmit the measuring signal to the measuring system; and
 receiving the measuring signal via a measuring antenna of the measuring system.

17. The measuring method according to claim 16, wherein the determination of the respective gain of the antenna-array for each iteration comprises:
 measuring a reception power of the measuring signal; and
 comparing the reception power to a transmission power of the measuring signal.

\* \* \* \* \*